(12) United States Patent
Nishi et al.

(10) Patent No.: US 12,489,901 B2
(45) Date of Patent: Dec. 2, 2025

(54) DECODING METHOD, ENCODING METHOD, DECODING DEVICE, AND ENCODING DEVICE

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/813,469

(22) Filed: Aug. 23, 2024

(65) Prior Publication Data
US 2024/0422318 A1    Dec. 19, 2024

Related U.S. Application Data

(63) Continuation of application No. PCT/JP2023/002431, filed on Jan. 26, 2023.

(60) Provisional application No. 63/316,070, filed on Mar. 3, 2022.

(51) Int. Cl.
*H04N 19/13*   (2014.01)
*H04N 19/597*  (2014.01)
*H04N 19/91*   (2014.01)

(52) U.S. Cl.
CPC .......... *H04N 19/13* (2014.11); *H04N 19/597* (2014.11); *H04N 19/91* (2014.11)

(58) Field of Classification Search
CPC ...... H04N 19/13; H04N 19/597; H04N 19/91; H04N 19/159; H04N 19/103; H04N 19/124; G06T 9/004
See application file for complete search history.

(56) References Cited

U.S. PATENT DOCUMENTS

| | | | |
|---|---|---|---|
| 2003/0108099 A1* | 6/2003 | Nagumo | G06T 9/20 375/E7.199 |
| 2014/0375638 A1 | 12/2014 | Tomaru et al. | |
| 2017/0142448 A1* | 5/2017 | Karczewicz | H04N 19/91 |
| 2022/0086444 A1* | 3/2022 | Piao | H04N 19/12 |

(Continued)

FOREIGN PATENT DOCUMENTS

WO    2014/020663    2/2014

OTHER PUBLICATIONS

Extended European Search Report issued May 9, 2025 in corresponding European Patent Application No. 23763150.2.

(Continued)

*Primary Examiner* — Joseph Suh
(74) *Attorney, Agent, or Firm* — Wenderoth, Lind & Ponack, L.L.P.

(57) ABSTRACT

A decoding method includes: determining a numerical range based on whether intra prediction or inter prediction is to be used to decode encoded first information of a current three-dimensional point; and switching a context between a first context and a second context to entropy-decode the encoded first information, based on whether an absolute value of decoded second information of the current three-dimensional point is included in the numerical range determined.

18 Claims, 5 Drawing Sheets

(56) References Cited

U.S. PATENT DOCUMENTS

2022/0159271 A1*  5/2022  Jun ........................ H04N 19/13
2024/0314320 A1*  9/2024  Peringassery Krishnan ................
                                                     H04N 19/13

OTHER PUBLICATIONS

Gao, S. et al., "[GPCC][EE13.51 related] Improved Coding of the Magnitude of Radius Residual", 137. MPEG Meeting; Jan. 17, 2022-Jan. 21, 2022; Online; (Motion Picture Expert Group or ISO/IEC JTC1/SC29/WG11),,No. m58719, Jan. 2022, XP030326974.
International Search Report (ISR) issued on Apr. 4, 2023 in International (PCT) Application No. PCT/JP2023/002431.

* cited by examiner

FIG. 3

| geometry_prediction_tree_node( ) { | Descriptor |
|---|---|
| ... | |
| if( InterFrameFlag ) | |
|     Intra_pred_flag | ae(v) |
| if( intra_pred_flag ) | |
|     pred_mode | ae(v) |
| else{ | |
|     if(NumRefFrames>1) | |
|         Inter_ref_frame_idx | ae(v) |
|     if( NumRefPoints>1 ) | |
|         Inter_ref_point_idx | ae(v) |
| } | |
| if( gps_alt coordinates_flag ) | |
|     for( j = 0; j < 2; j++ ) | |
|         quantized_1st_residual_value[ j ] | ae(v) |
| for( i = 0; i < 3; i++ ) | |
|     1st_residual_value[ i ] | ae(v) |
| if( gps_coordinate_trans_enabled_flag ) | |
|     for( i = 0; i < 3; i++ ) | |
|         2nd_residual_value[ i ] | ae(v) |
| ... | |
| } | |

DECODING METHOD, ENCODING METHOD, DECODING DEVICE, AND ENCODING DEVICE

CROSS REFERENCE TO RELATED APPLICATIONS

This application is a U.S. continuation application of PCT International Patent Application Number PCT/JP2023/002431 filed on Jan. 26, 2023, claiming the benefit of priority of U.S. Provisional Patent Application No. 63/316,070 filed on Mar. 3, 2022, the entire contents of which are hereby incorporated by reference.

FIELD

The present disclosure relates to a decoding method, an encoding method, a decoding device, and an encoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

In encoding processing and decoding processing of three-dimensional data, there is a demand for improving encoding efficiency and reducing the amount of data handled in a decoding device.

The present disclosure provides a decoding method, an encoding method, a decoding device, or an encoding device capable of improving encoding efficiency and reducing the amount of data handled in the decoding device.

Solution to Problem

A three-dimensional data decoding method according to an aspect of the present disclosure includes: determining a numerical range based on whether intra prediction or inter prediction is to be used to decode encoded first information of a current three-dimensional point; and switching a context between a first context and a second context to entropy-decode the encoded first information, based on whether an absolute value of decoded second information of the current three-dimensional point is included in the numerical range determined.

A three-dimensional data encoding method according to an aspect of the present disclosure includes: determining a numerical range based on whether intra prediction or inter prediction is to be used to encode first information of a current three-dimensional point; and switching a context between a first context and a second context to entropy-encode the first information, based on whether an absolute value of information second of the current three-dimensional point is included in the numerical range determined.

Advantageous Effects

The present disclosure can provide a decoding method, an encoding method, a decoding device, or an encoding device capable of improving encoding efficiency and reducing the amount of data handled in the decoding device.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram illustrating an example of a syntax of node information of a three-dimensional point according to the embodiment.

DESCRIPTION OF EMBODIMENTS

Figure 1:
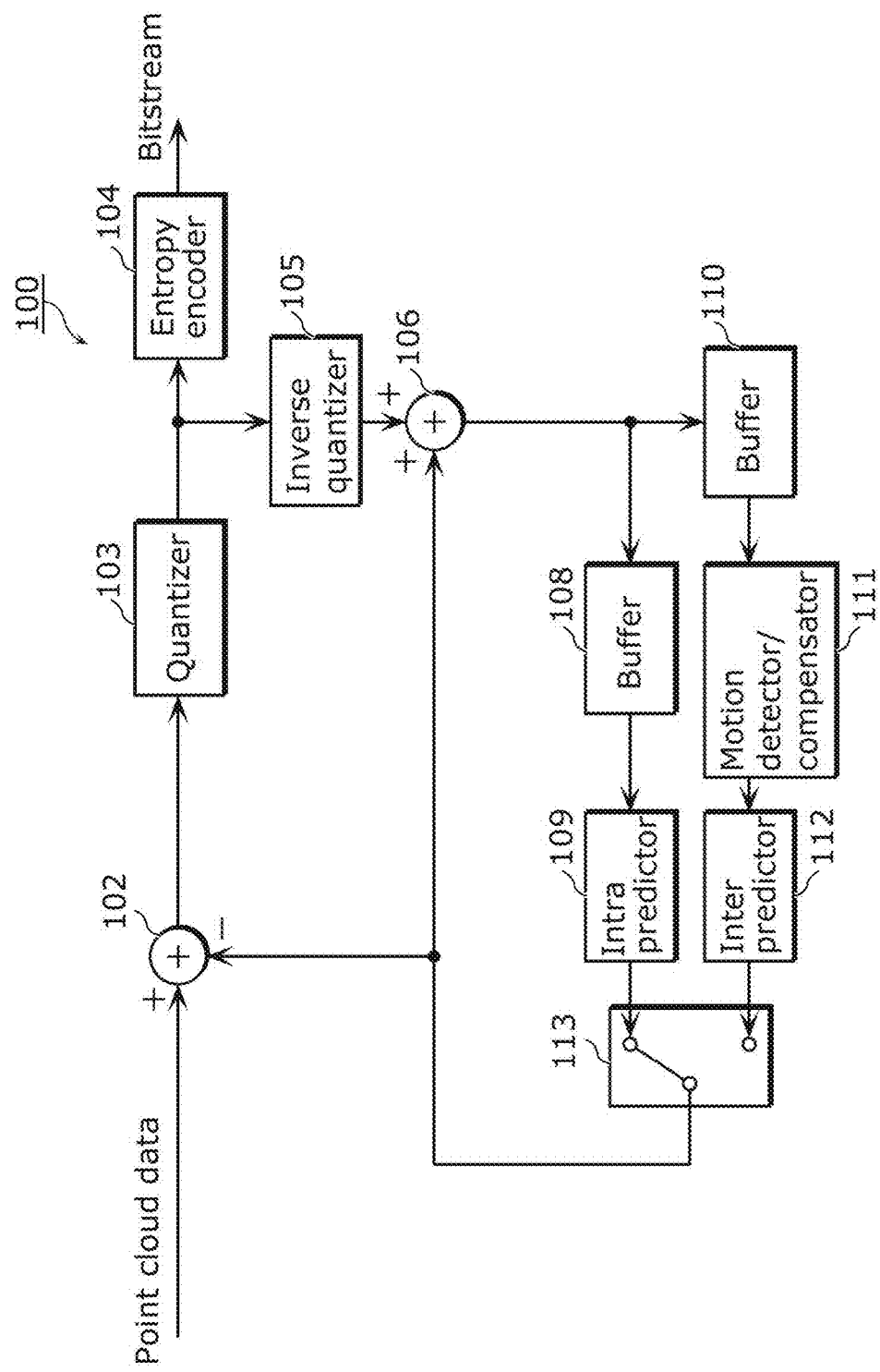
FIG. 1 is a block diagram of a three-dimensional data encoding device according to an embodiment.

According to conventional art related to the decoding of three-dimensional points, if the absolute value of decoded information on a three-dimensional point is greater than a threshold, the residual of to-be-decoded information on the three-dimensional point is likely to be great. Therefore, a context suitable for great residuals is selected. A great residual is likely to result from incorrect prediction. Conversely, if the absolute value is smaller than or equal to the threshold, the residual is likely to be small. Therefore, a context suitable for small residuals is selected. A small residual is likely to result from correct prediction.

The context selection according to conventional art improves encoding efficiency of an encoding device, thereby reducing the code amount. This leads to a reduced amount of data handled in a decoding device, and thus allows for a reduced processing load on the decoding device.

Unfortunately, such context selection in encoding and decoding three-dimensional points in conventional art addresses only the intra prediction scheme to improve encoding efficiency and reduce the amount of data handled in a decoding device.

In view of the above, the present disclosure describes methods and devices in which, in encoding and decoding three-dimensional points, a context capable of improving encoding efficiency and reducing the amount of data handled in decoding is selected for a prediction scheme not limited to the intra prediction scheme.

A decoding method according to an aspect of the present disclosure includes: determining a numerical range based on whether intra prediction or inter prediction is to be used to decode encoded first information of a current three-dimensional point; and switching a context between a first context and a second context to entropy-decode the encoded first information, based on whether an absolute value of decoded second information of the current three-dimensional point is included in the numerical range determined.

The magnitude of the value of the second information relative to the prediction residual of the first information may differ between the intra prediction scheme and the inter prediction scheme. The above aspect therefore changes, based on whether the inter prediction scheme is used or the intra prediction scheme is used, the numerical range that is used for determining context switching and that may include the value of the decoded second information. That is, the above aspect changes the numerical range based on the probability of correctness of prediction by the prediction scheme. Accordingly, a context corresponding to the probability of correctness (or incorrectness) of prediction by the prediction scheme is selected. This can reduce the data amount of a bitstream (encoded data) and thus reduce the amount of data handled in a decoding device.

For example, in the determining, a threshold for specifying an upper limit and a lower limit of the numerical range may be determined, and in the switching, the threshold determined may be compared with the absolute value of the decoded second information to switch the context.

Accordingly, whether or not the second information is included in the numerical range can be determined by comparing the threshold with the absolute value of the second information.

For example, in the determining: a first threshold may be determined when the intra prediction is to be used to decode the encoded first information; and a second threshold greater than the first threshold may be determined when the inter prediction is to be used to decode the encoded first information.

In the inter prediction scheme, the magnitude of the value (e.g., the prediction residual) of the second information relative to the prediction residual of the first information may be greater than that in the intra prediction scheme. The above aspect therefore increases the threshold when the inter prediction scheme is used, thereby increasing the possibility of selecting a context suitable for the magnitude of the prediction residual of the first information. It should be noted that even the intra prediction scheme may sometimes result in a great magnitude of the value of the second information relative to the prediction residual of the first information.

For example, the first threshold may be 0, and the second threshold may be an integer value greater than or equal to 1.

For example, the decoded second information may indicate a prediction residual of one of a horizontal angle and an elevation angle of the current three-dimensional point, and the encoded first information may be generated by encoding a prediction residual of a distance of the current three-dimensional point.

Accordingly, if the prediction residual of the distance depends on the absolute value of the horizontal angle or the elevation angle (i.e., if the probability of correctness of predicting the distance depends on the absolute value of the horizontal angle or the elevation angle), the above manner can increase the possibility of selecting a context suitable for the magnitude of the prediction residual.

For example, the decoded second information may indicate a quantized value of one of a horizontal angle and an elevation angle of the current three-dimensional point, and the encoded first information may be generated by encoding a prediction residual of at least one of a distance, the horizontal angle, or the elevation angle of the current three-dimensional point.

Accordingly, if the prediction residual of at least one of the distance, the horizontal angle, or the elevation angle depends on the absolute value of the quantized value of the horizontal angle or the elevation angle, the above manner can increase the possibility of selecting a context suitable for the magnitude of the prediction residual.

For example, the decoded second information may indicate the quantized value of the prediction residual of the horizontal angle of the current three-dimensional point.

Accordingly, if the prediction residual of at least one of the distance, the horizontal angle, or the elevation angle depends on the absolute value of the quantized value of the horizontal angle, the above manner can increase the possibility of selecting a context suitable for the magnitude of the prediction residual. The inventors have found, by experiment, that this combination effectively increases encoding efficiency and reduces the amount of data handled in the decoding device.

For example, in the determining, the first threshold that is a non-zero threshold may be determined when the intra prediction is to be used for the current three-dimensional point.

An encoding method according to an aspect of the present disclosure includes: determining a numerical range based on whether intra prediction or inter prediction is to be used to encode first information of a current three-dimensional point; and switching a context between a first context and a second context to entropy-encode the first information, based on whether an absolute value of second information of the current three-dimensional point is included in the numerical range determined.

The magnitude of the value of the second information relative to the prediction residual of the first information may differ between the intra prediction scheme and the inter prediction scheme. The above aspect therefore changes, based on whether the inter prediction scheme is used or the intra prediction scheme is used, the numerical range of the absolute value of the second information that is used for determining context switching. That is, the above aspect changes the numerical range based on the probability of correctness of prediction by the prediction scheme. Accordingly, a context corresponding to the probability of correctness (or incorrectness) of prediction by the prediction scheme is selected, and thus encoding efficiency can be improved.

For example, in the determining, a threshold for specifying an upper limit and a lower limit of the numerical range may be determined, and in the switching, the threshold determined may be compared with the absolute value of the second information to switch the context.

Accordingly, whether or not the second information is included in the numerical range can be determined by comparing the threshold with the absolute value of the second information.

For example, in the determining: a first threshold may be determined when the intra prediction is to be used to encode the first information; and a second threshold greater than the first threshold may be determined when the inter prediction is to be used to encode the first information.

That is, the above aspect increases the threshold in using the inter prediction scheme, which tends to have a lower probability of correctness than the intra prediction scheme. This can increase the possibility of selecting a context suitable for the magnitude of the prediction residual. It should be noted that even the intra prediction scheme may sometimes tend to have a low probability of correctness.

For example, the first threshold may be 0, and the second threshold may be an integer value greater than or equal to 1.

For example, the second information may indicate a prediction residual of one of a horizontal angle and an elevation angle of the current three-dimensional point, and the first information may indicate a prediction residual of a distance of the current three-dimensional point.

Accordingly, if the prediction residual of the distance depends on the absolute value of the horizontal angle or the elevation angle, the possibility of selecting a context suitable for the magnitude of the prediction residual can be increased.

For example, the second information may indicate a quantized value of one of a horizontal angle and an elevation angle of the current three-dimensional point, and the first information may indicate a prediction residual of at least one of a distance, the horizontal angle, or the elevation angle of the current three-dimensional point.

Accordingly, if the prediction residual of at least one of the distance, the horizontal angle, or the elevation angle depends on the absolute value of the quantized value of the horizontal angle or the elevation angle, the possibility of selecting a context suitable for the magnitude of the prediction residual can be increased.

For example, the second information may indicate the quantized value of the prediction residual of the horizontal angle of the current three-dimensional point.

Accordingly, if the prediction residual of at least one of the distance, the horizontal angle, or the elevation angle depends on the absolute value of the quantized value of the horizontal angle, the possibility of selecting a context suitable for the magnitude of the prediction residual can be increased. The inventors have found, by experiment, that this combination effectively increases encoding efficiency and reduces the amount of data handled in the decoding device.

For example, in the determining, the first threshold that is a non-zero threshold may be determined when the intra prediction is to be used for the current three-dimensional point.

A decoding device according to an aspect of the present disclosure includes a processor and memory. Using the memory, the processor: determines a numerical range based on whether intra prediction or inter prediction is to be used to decode encoded first information of a current three-dimensional point; and switches a context between a first context and a second context to entropy-decode the encoded first information, based on whether an absolute value of decoded second information of the current three-dimensional point is included in the numerical range determined.

An encoding device according to an aspect of the present disclosure includes a processor and memory. Using the memory, the processor: determines a numerical range based on whether intra prediction or inter prediction is to be used to encode first information of a current three-dimensional point; and switches a context between a first context and a second context to entropy-encode the first information, based on whether an absolute value of second information of the current three-dimensional point is included in the numerical range determined.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

EMBODIMENT

First, a configuration of a three-dimensional data encoding device and a three-dimensional data decoding device according to the present embodiment will be described. FIG. 1 is a block diagram illustrating the configuration of three-dimensional data encoding device 100. Three-dimensional data encoding device 100 encodes a point cloud which is three-dimensional data to thereby generate a bitstream (an encoded stream).

A point cloud, which is a set of three-dimensional points, represents the three-dimensional shape of an object. The point cloud data includes position information and attribute information on the three-dimensional points. The position information indicates the three-dimensional position of each three-dimensional point. It should be noted that the position information may also be called geometry information.

For example, position information is represented using a polar coordinate system and includes one distance component and two direction components (angle components). Specifically, position information includes distance d, elevation angle $\theta$, and horizontal angle $\phi$. Point cloud data is, for example, data obtained by a laser sensor such as LiDAR, and the like. It should be noted that position information may be represented using an orthogonal coordinate system (x, y, z).

The attribute information indicates, for example, attributes such as the color, reflectance, and normal vector. One three-dimensional point may have one item of attribute information or may have a plurality of items of attribute information.

The three-dimensional data is not limited to point cloud data and may be other types of three-dimensional data, such as mesh data. Mesh data (also called three-dimensional mesh data) is a data format used for computer graphics (CG)

and represents the three-dimensional shape of an object as a set of surface information items. For example, mesh data includes point cloud information (e.g., vertex information), which may be processed by techniques similar to those for point cloud data.

It should be noted that although FIG. 1 illustrates processing units related to the encoding of position information of point cloud data, three-dimensional data encoding device 100 may include other processing units such as processing units that perform encoding of attribute information, and so on.

Three-dimensional data encoding device 100 includes subtractor 102, quantizer 103, entropy encoder 104, inverse quantizer 105, adder 106, buffer 108, intra predictor 109, buffer 110, motion detector/compensator 111, inter predictor 112, and switcher 113.

Subtractor 102 subtracts a prediction value from position information included in input point cloud data to be encoded to generate a prediction residual. Quantizer 103 quantizes the prediction residual. Entropy encoder 104 entropy-encodes the quantized prediction residual to generate a bitstream. Entropy encoder 104 also entropy-encodes control information and adds the encoded information to the bitstream.

Inverse quantizer 105 inverse-quantizes the quantized prediction residual generated by quantizer 103 to generate a prediction residual. Adder 106 adds the prediction value to the prediction residual generated by inverse quantizer 105 to reproduce the position information. Buffer 108 retains the reproduced position information as a reference point cloud for intra prediction. Buffer 110 retains the reproduced position information as a reference point cloud for inter prediction.

It should be noted that there is a possibility that the reproduced position information includes a quantization error and therefore does not perfectly agree with the original position information. It should be noted that a three-dimensional point reproduced by encoding processing and decoding processing is referred to as an encoded three-dimensional point, a decoded three-dimensional point or a processed three-dimensional point.

Intra predictor 109 calculates a prediction value using position information of one or more reference points, which are other three-dimensional points belonging to the same frame as a three-dimensional point to be processed (referred to as a current point hereinafter) and are already processed. For example, intra predictor 109 performs intra prediction using a prediction tree. The prediction tree is a tree structure that indicates a reference relationship in prediction processing. For example, in prediction processing of a current node (current point), position information of a parent node is referred to. It should be noted that in prediction processing, position information of a plurality of nodes (such as a grandparent node or a great-grandparent node) including a parent node may be referred to.

Motion detector/compensator 111 detects a displacement between a current frame, which is a frame including a current point, and a reference frame, which is a frame other than the current frame, (motion detection) and corrects position information of a point cloud included in the reference frame based on the detected displacement (motion compensation). Information indicating the detected displacement (motion information) is stored in the bitstream, for example.

Inter predictor 112 calculates a prediction value using position information of one or more reference points included in a point cloud subjected to the motion compensation. It should be noted that the motion detection and the motion compensation need not be performed.

Switcher 113 selects one of the prediction value calculated by intra predictor 109 and the prediction value calculated by inter predictor 112, and outputs the selected prediction value to subtractor 102 and adder 106. That is, switcher 113 switches whether to use intra prediction or to use inter prediction. For example, this switching may be based on comparing the cost (code amount) involved in using intra prediction and the cost involved in using inter prediction, and selecting the lower-cost scheme. Alternatively, this switching may be based on an external instruction, or based on the point cloud or information associated with the point cloud. Information indicating whether intra prediction is used or inter prediction is used is stored in the bitstream.

Figure 2:
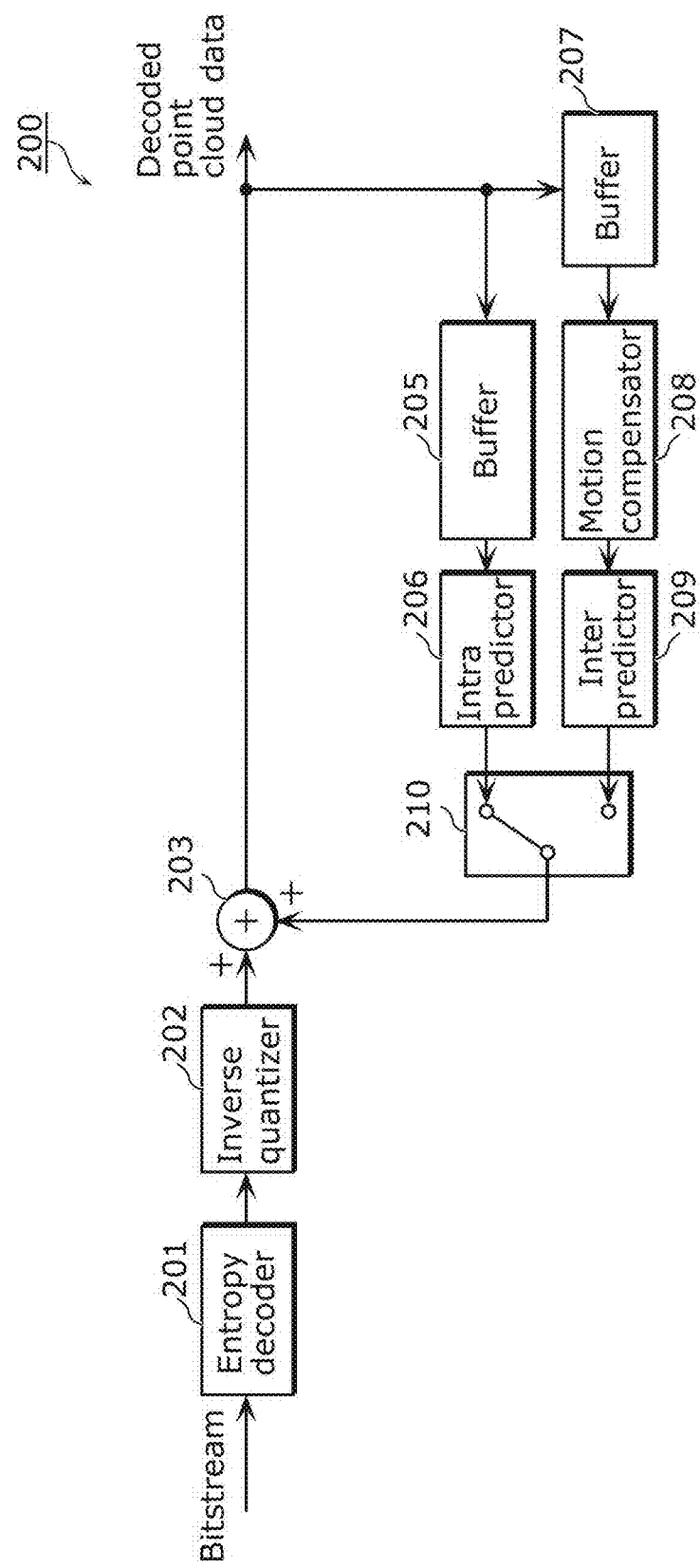
FIG. 2 is a block diagram of a three-dimensional data decoding device according to the embodiment.

Next, a configuration of three-dimensional data decoding device 200 that decodes the bitstream generated by three-dimensional data encoding device 100 described above will be described. FIG. 2 is a block diagram of three-dimensional data decoding device 200 according to the present embodiment. It should be noted that although FIG. 2 shows a processor concerning decoding of position information of a point cloud, three-dimensional data decoding device 200 may include another processor, such as a processor that performs decoding or the like of attribute information of a point cloud. For example, three-dimensional data decoding device 200 generates decoded point cloud data by decoding the bitstream generated by three-dimensional data encoding device 100 shown in FIG. 1.

Three-dimensional data decoding device 200 includes entropy decoder 201, inverse quantizer 202, adder 203, buffer 205, intra predictor 206, buffer 207, motion compensator 208, inter predictor 209, and switcher 210.

Three-dimensional data decoding device 200 obtains the bitstream generated by three-dimensional data encoding device 100.

Entropy decoder 201 entropy-decodes the bitstream to generate a quantized prediction residual and control information.

Inverse quantizer 202 inverse-quantizes the quantized prediction residual generated by entropy decoder 201 to generate a prediction residual. Adder 203 adds a prediction value to the prediction residual generated by inverse quantizer 202 to reproduce the position information. The position information is output as decoded point cloud data.

Buffer 205 retains the decoded position information as a reference point cloud for intra prediction. Buffer 207 retains the reproduced position information as a reference point cloud for inter prediction. Intra predictor 206 calculates a prediction value using position information of one or more reference points, which are other three-dimensional points belonging to the same frame as the current point. For example, intra predictor 206 performs intra prediction using a prediction tree.

Motion compensator 208 obtains, from the bitstream, motion information indicating a displacement between a current frame and a reference frame and corrects position information of a point cloud included in the reference frame based on the displacement indicated by the motion information (motion compensation). Inter predictor 209 calculates a prediction value using position information of one or more reference points included in the point cloud subjected to the motion compensation. It should be noted that the motion compensation need not be performed.

Switcher 210 selects one of the prediction value calculated by intra predictor 206 and the prediction value calculated by inter predictor 209, and outputs the selected prediction value to adder 203. For example, this switching is based on the information in the bitstream indicating whether intra prediction is used or inter prediction is used.

FIG. 3 is a diagram illustrating an example of a syntax of node (geometry_prediction_tree_node) on information a three-dimensional point according to the embodiment. This syntax is an example of information on each node in a prediction tree.

InterFrameFlag indicates whether inter prediction can be used. InterFrameFlag is set according to a higher-level syntax (such as the SPS, GPS, or slice header). The SPS (Sequence Parameter Set) is a parameter set (control information) for each sequence including multiple frames. The SPS is also a parameter set common to position information and attribute information. The GPS (Geometry Parameter Set) is a parameter set for each frame and is a parameter set for position information.

intra_pred_flag indicates whether the prediction scheme applied to encoding or decoding the current point is intra prediction or not (i.e., whether it is intra prediction or inter prediction). For example, the value 1 indicates intra prediction, and the value 0 indicates inter prediction.

For example, intra_pred_flag is included in the node information if InterFrameFlag indicates that inter prediction can be used, and not included in the node information if InterFrameFlag indicates that inter prediction cannot be used (is disabled).

If intra prediction is applied (intra_pred_flag=1), the node information includes pred_mode. pred_mode indicates the prediction mode applied to encoding or decoding the current point. The prediction mode is information indicating how an intra prediction point for the current point is determined. For example, the prediction mode indicates the manner in which the prediction point is calculated based on the position(s) of one or more higher nodes for the current node in the prediction tree.

If inter prediction is applied (intra_pred_flag=0), the node information includes one or more items of inter_ref_frame_idx and one or more items of inter_ref_point_idx.

NumRefFrames indicates the number of frames (point clouds) referred to in inter prediction, and is set according to a higher-level syntax (such as the SPS, GPS, or slice header).

inter_ref_frame_idx is included in the node information if inter prediction is applied (intra_pred_flag=0) and if NumRefFrames is greater than 1. inter_ref_frame_idx indicates each frame referred to in the inter prediction of the current point.

NumRefPoints indicates the number of prediction points referred to in inter prediction. inter_ref_point_idx is included in the node information if inter prediction is applied (intra_pred_flag=0) and if NumRefPoints is greater than 1. inter_ref_point_idx indicates each prediction point referred to in the inter prediction of the current point.

gps_alt_coordinates_flag indicates whether the encoding or decoding processing of the point cloud is performed using orthogonal coordinates (the value 0) or coordinates different from orthogonal coordinates (e.g., polar coordinates) (the value 1). gps_alt_coordinates_flag is added to the bitstream.

If gps_alt_coordinates_flag indicates the use of polar coordinates (e.g., gps_alt_coordinates_flag=1), the node information includes quantized_1st_residual_value[j].

quantized_1st_residual_value[j] (j is 0 to 2) indicates a quantized value (quantized prediction residual) of the prediction residual of each direction component, among the prediction residuals (difference information) between the coordinate values of the current point to be encoded or decoded and the coordinate values (prediction values) of the prediction point.

For example, the three-dimensional data encoding device generates quantized_1st_residual_value[j] (j is 0 or 1) by using a quantization step value to quantize the prediction residual of the horizontal angle component and the prediction residual of the elevation angle component. Information indicating the quantization step value is stored in, for example, a higher-level syntax (such as the SPS, GPS, or slice header) in the bitstream.

In addition to quantized_1st_residual_value[j], the three-dimensional data encoding device may store, in the bitstream, a remainder component that is the difference between the unquantized prediction residual and the quantized prediction residual (quantized value). For example, this remainder component may be stored as 1st_residual_value[i] in the bitstream. Specifically, the remainder component of each of the horizontal angle and the elevation angle may be stored in the bitstream as 1st_residual_value of each of the horizontal angle and the elevation angle.

Thus, in encoding point cloud data obtained by a sensor that changes the sensing direction at a certain speed, the three-dimensional data encoding device may be able to reduce the code amount of the prediction residuals of the direction components by setting a quantization step value according to the speed. The three-dimensional data encoding device may encode point cloud data generated with a sensor, for example a rotationally scanning laser sensor such as a LIDAR sensor, that obtains the three-dimensional positions of an object in the surrounding area while rotating in one direction. In such a case, for one of the direction components (e.g., the horizontal angle) in the same direction as the rotation direction of the sensor, the device may store the quantized value and the remainder component in the bitstream. For the other direction component (e.g., the elevation angle) and the distance component, the device may store only the quantized value or only the unquantized prediction residual (1st_residual_value) in the bitstream.

1st_residual_value[i] indicates the prediction residual of each of the components (the horizontal angle, elevation angle, and distance, or x, y, z) of the position information on the current point. If remainder components are stored in the bitstream as described above, 1st_residual_value[i] indicates the remainder component of each corresponding component.

gps_coordinate_trans_enabled_flag indicates whether the position coordinates are transformed or not before encoding or after decoding. If the coordinates are transformed (gps_coordinate_trans_enabled_flag=1), the three-dimensional data encoding device transforms the input position information in the orthogonal coordinate system into position information in the polar coordinate system and then encodes it. The three-dimensional data decoding device transforms the decoded position information in the polar coordinate system into position information in the orthogonal coordinate system and then outputs it.

If the coordinates are transformed (gps_coordinate_trans_enabled_flag=1), the node information includes 2nd_residual_value[i]. 2nd_residual_value[i] indicates the difference, yielded by the coordinate transform, between the position information in the orthogonal coordinate system and the position information in the polar coordinate system. The three-dimensional data decoding device adds this difference to the transformed position information in the orthogonal coordinate system resulting from transforming the decoded position information in the polar coordinate system. Thus, the original position information in the orthogonal coordinate system is reproduced.

Now, how a context is selected in the entropy encoding or decoding processing of the prediction residual will be described. While the following mainly describes the manners of selecting a context in the three-dimensional data encoding device, the context is selected in similar manners in the three-dimensional data decoding device.

The three-dimensional data encoding device may determine, based on quantized_1st_residual_value[j], the context (probability table) to be used for the entropy encoding (arithmetic encoding) of 1st_residual_value[i].

Here, the context (probability table) indicates the appearance probability of a symbol (signal value). The probability is updated according to a processed symbol, and the updated probability is used for arithmetic encoding of a subsequent signal. Based on the probability, a correspondence relationship between an input value and an output value in the arithmetic encoding is determined.

The three-dimensional data encoding device may also determine, based on a processed (encoded) first component of 1st_residual_value[i], the context to be used for the entropy encoding of a second component of 1st_residual_value[i] different from the first component. Here, the first component is, for example, any one of the horizontal angle, elevation angle, and distance in polar coordinates. The second component is, for example, any one of the horizontal angle, elevation angle, and distance that is different from the first component.

For example, when the three-dimensional positions of an object in the surrounding area are obtained by a sensor such as a LIDAR sensor centered on the sensor position and when a point cloud generated from such three-dimensional positions is encoded using polar coordinates, the three-dimensional data encoding device may select, among multiple contexts, the context to be used in the arithmetic encoding of the prediction residual of the distance (1st_residual_value[i]). This context may be selected based on the quantized value (quantized_1st_residual_value[j]) of at least one of the prediction residual of the horizontal angle or the prediction residual of the elevation angle. For example, the three-dimensional data encoding device may switch the context to be used in the arithmetic encoding of the prediction residual of the distance based on whether the quantized value of the prediction residual of the horizontal angle is 0.

The three-dimensional data encoding device may also select the context to be used for the arithmetic encoding of the prediction residual (1st_residual_value[i]) of a direction component (the horizontal angle or the elevation angle) among multiple contexts, based on 1st_residual_value[i] corresponding to the prediction residual of the distance. For example, the three-dimensional data encoding device may switch the context to be used for the arithmetic encoding of the prediction residual of a direction component (the horizontal angle or the elevation angle) based on whether the absolute value of the prediction residual of the distance is greater than a threshold. This threshold may be a predetermined fixed value or a variable value. If the threshold is a variable value, information indicating the threshold may be stored in the bitstream. For example, this information may be stored in the SPS, GPS, or slice header.

That is, the three-dimensional data encoding device may on the quantized prediction switch, based residual (quantized_1st_residual_value[j]) of a first component, the context to be used for the entropy encoding of the prediction residual (1st_residual_value[i]) of a second component. The second component may be the same as or different from the first component. If the second component is the same as the first component, 1st_residual_value[i] indicates the above-described remainder component, for example.

The three-dimensional data encoding device may also switch, based on the prediction residual (1st_residual_value[i]) of a first component, the context to be used for the entropy encoding of the prediction residual (1st_residual_value[i]) of a second component different from the first component. For example, one of the first component and the second component may be a direction component (the horizontal angle or the elevation angle), and the other may be the distance component.

Thus, based on a prediction residual or its quantized value, which correlates with the probability of correctness of intra prediction or inter prediction, the three-dimensional data encoding device may determine the context to be used in the arithmetic encoding of a subsequent prediction residual. This may be able to improve encoding efficiency.

The three-dimensional data encoding device may also determine the context to be used for the entropy encoding of 1st_residual_value[i] of the current point based on whether the current point is encoded using intra coding mode or inter coding mode (e.g., whether intra_pred_flag is 1).

The three-dimensional data encoding device may also determine, based on whether a first component of the current point is encoded using intra coding mode or inter coding mode, the context to be used for the entropy encoding of 1st_residual_value[i] of a second component of the current point. The second component may be the same as or different from the first component.

Thus, the three-dimensional data encoding device may use different contexts for intra prediction and inter prediction, which have different tendencies in the distribution of prediction residuals. This may be able to improve encoding efficiency.

The three-dimensional data encoding device may also determine the context to be used for the arithmetic encoding of 1st_residual_value[i] of the second component by combining some or all of the above-described manners of context determination that may be based on quantized_1st_residual_value[j], 1st_residual_value[i] of the encoded first component, and whether intra_pred_flag is 1.

Further, the three-dimensional data encoding device may determine the context to be used for the arithmetic encoding of 1st_residual_value[i] by combining, with the above-described manners of context determination, some or all of the manners of context determination that are based on other parameters related to prediction scheme. For example, other parameters related to prediction scheme include pred_mode, inter_ref_frame_idx, and inter_red_point_idx.

Specifically, the three-dimensional data encoding device may determine the context based on pred_mode, that is, for example, based on whether or not the prediction value is determined using some or all of the components of the coordinates of the parent node or the immediately preceding encoded node in the prediction tree in intra prediction. The three-dimensional data encoding device may determine the context based on inter_ref_frame_idx, that is, based on which reference frame was used for inter prediction. The three-dimensional data encoding device may determine the context based on inter_red_point_idx, that is, based on which reference point was used for inter prediction. The three-dimensional data encoding device can combine some or all of these manners to select a context suitable for the characteristics of the prediction residual. This may be able to further improve encoding efficiency.

It should be noted that 1st_residual_value[i] may be encoded as multiple syntax elements, such as a sign part and an absolute value part. In this case, the above-described manners of context determination may be applied to all the syntax elements related to 1st_residual_value[i], or to not all of the syntax elements, such as only the syntax element related to the absolute value part.

Figure 4:
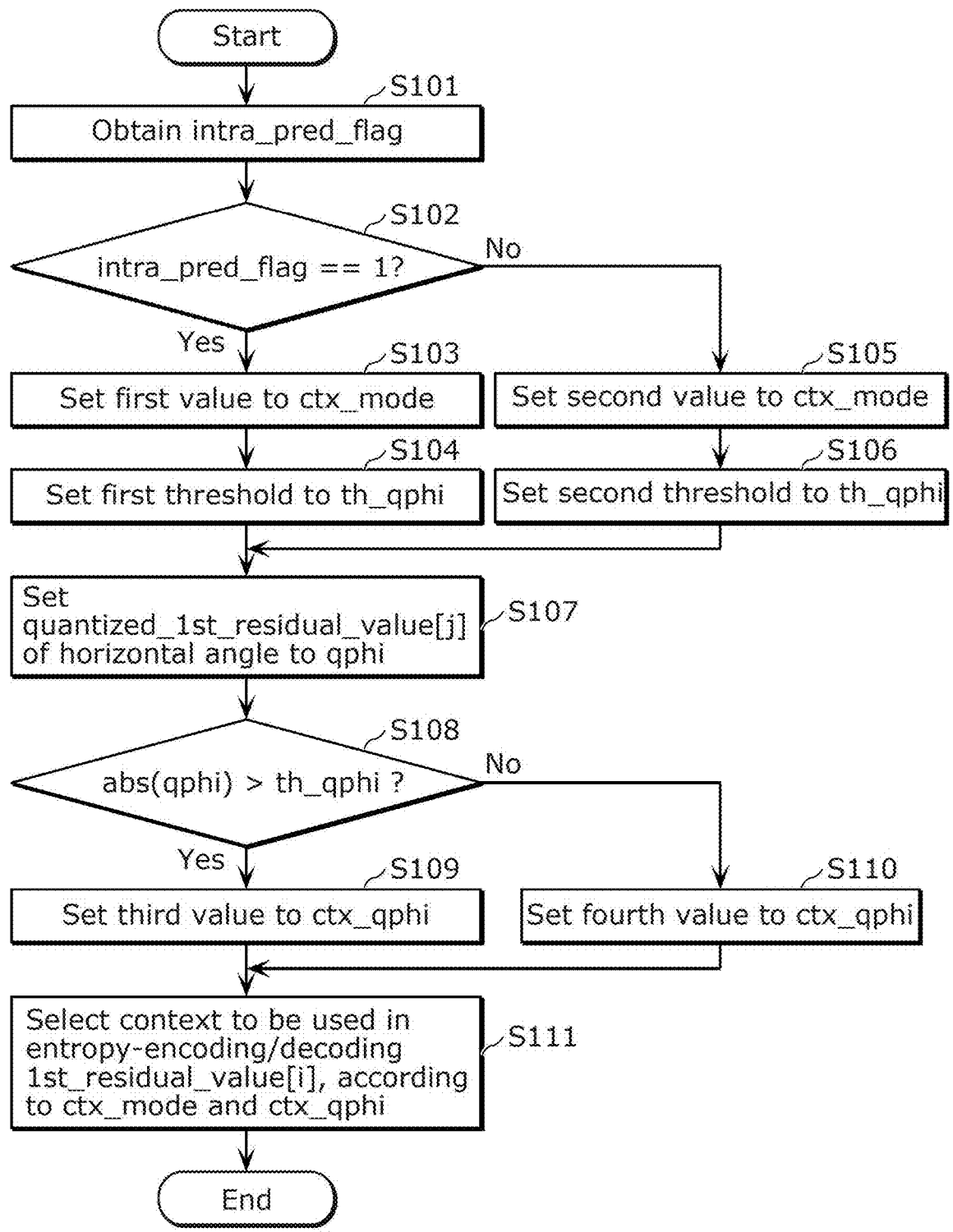
FIG. 4 is a flowchart illustrating an example of a procedure of determining a context according to the embodiment.

FIG. 4 is a flowchart illustrating an example of a procedure of determining the context to be used in the arithmetic encoding of 1st_residual_value[i] in the syntax example illustrated in FIG. 3.

First, the three-dimensional data encoding device obtains intra_pred_flag (S101). Based on intra_pred_flag obtained, the three-dimensional data encoding device determines whether the prediction scheme (coding mode) is intra prediction (intra_pred_flag=1) or inter prediction (intra_pred_flag=0) (S102).

If the prediction scheme is determined to be intra prediction (Yes at S102), the three-dimensional data encoding device sets ctx_mode to a first value for selecting a context corresponding to intra prediction (intra coding mode) (S103). Further, the three-dimensional data encoding device sets the threshold th_qphi to a first threshold corresponding to intra prediction (S104).

Conversely, if the prediction scheme is determined to be inter prediction (No at S102), the three-dimensional data encoding device sets ctx_mode to a second value for selecting a context corresponding to inter prediction (inter coding mode) (S105). Further, the three-dimensional data encoding device sets the threshold th_qphi to a second threshold corresponding to inter prediction (S106). For example, the second value is different from the first value, and the second threshold is different from the first threshold.

The three-dimensional data encoding device obtains quantized_1st_residual_value[j] of the horizontal angle and sets qphi to quantized_1st_residual_value[j] of the horizontal angle obtained (S107).

The three-dimensional data encoding device determines whether the absolute value (abs (qphi)) of qphi is greater than the threshold th_qphi set at step S104 or S106 (S108). Based on this determination, the three-dimensional data encoding device determines the probability of correctness of the prediction value, which is a predicted coordinate value.

If the absolute value of qphi is greater than th_qphi (Yes at S108), the three-dimensional data encoding device sets ctx_qphi to a third value (S109). The absolute value of qphi being greater than th_qphi indicates a low probability of correctness of the prediction value. The third value is for selecting a context corresponding to low probabilities of correctness of the prediction value.

Conversely, if the absolute value of qphi is smaller than or equal to th_qphi (No at S108), the three-dimensional data encoding device sets ctx_qphi to a fourth value (S110). The absolute value of qphi being smaller than or equal to th_qphi indicates a probability of correctness of the prediction value higher than in the case of the absolute value of qphi being greater than th_qphi. The fourth value is for selecting a context corresponding to high probabilities of correctness of the prediction value.

Lastly, based on ctx_mode set at step S103 or S105 and ctx_qphi set at step S109 or S110, the three-dimensional data encoding device selects the context to be used for the arithmetic encoding of 1st_residual_value[i] (S111). For example, one of four contexts is selected according to the combination of ctx_mode and ctx_qphi.

The above procedure may be applied to all the components of the prediction residual 1st_residual_value[i] or to not all of the components, such as only the distance component or a direction component.

The above procedure assumes that, if the absolute value of the prediction residual of the horizontal angle is small at step S108, the prediction is working well and the absolute value of the prediction residual of the distance is also small. Based on this assumption, the probability of correctness of the prediction value is determined to be high if the absolute value of qphi is smaller than or equal to the threshold th_qphi. In inter prediction, however, the absolute value of the prediction residual of the distance tends to be small, compared with intra prediction, even if the prediction residual of the horizontal angle is great. This is because the prediction value is determined in inter prediction based on a point in a reference frame different from the current frame. Therefore, for example, the first threshold is desirably a value such as 0 or 1, and the second threshold is desirably a value greater than the first threshold, such as 1 or 2.

Thus, the threshold th_qphi for determining the probability of correctness of the prediction value can be set individually for intra prediction and inter prediction, which differ in prediction characteristics. A more appropriate context can therefore be selected for each of intra prediction and inter prediction, and this may be able to improve encoding efficiency.

It should be noted that all of the elements disclosed with reference to FIG. 3 and FIG. 4 are not always necessary, and the three-dimensional and it is acceptable for the encoding device to perform only part of the processes.

The above has described mainly the manners of determining a context in arithmetic encoding performed by the three-dimensional data encoding device. Similar manners may be used to determine a context in arithmetic decoding performed by the three-dimensional data decoding device. The operations of the three-dimensional data decoding device may be described by replacing encoding in the above description with decoding.

In the above description, step S108 determines whether the absolute value of qphi is greater than the threshold th_qphi. This determination is equivalent to the processing of determining whether $-\text{th\_qphi} \leq \text{qphi} \leq \text{th\_qphi}$ is satisfied. That is, this determination is the processing of determining whether qphi falls within a numerical range having the upper limit +th_qphi and the lower limit −th_qphi. Comparing the absolute value with the threshold means using a numerical range centered around 0; however, a numerical range centered around a non-zero value may be used.

If th_qphi is 0, the determination processing at step S108 is equivalent to the processing of determining whether qphi is 0. That is, this determination is the processing of determining whether qphi is a predetermined value. Comparing the absolute value with the threshold=0 means that the predetermined value is 0; however, the predetermined value may be a non-zero value.

Figure 5:
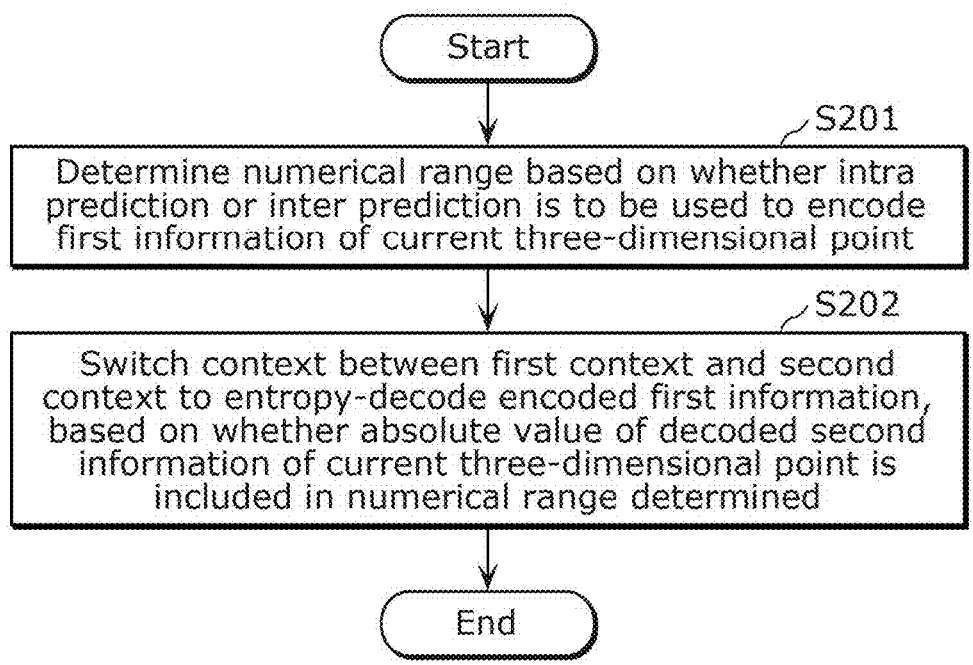
FIG. 5 is a flowchart of a three-dimensional data encoding method according to the embodiment.

As described above, the encoding device (three-dimensional data encoding device) according to the present embodiment performs the process illustrated in FIG. 5. The encoding device determines a numerical range based on whether intra prediction or inter prediction is to be used to encode first information of a current three-dimensional point (S201), and switches a context between a first context and a second context to entropy-encode the first information, based on whether an absolute value of second information of the current three-dimensional point is included in the numerical range determined (S202). For example, the encoding device selects the first context when the value of the second information of the current three-dimensional point is included in the determined numerical range, and selects the second context when the when the value of the second information of the current three-dimensional point is not included in the determined numerical range.

The magnitude of the value of the second information relative to the prediction residual of the first information may differ between the intra prediction scheme and the inter prediction scheme. The above aspect therefore changes, based on whether the inter prediction scheme is used or the intra prediction scheme is used, the numerical range of the absolute value of the second information that is used for determining context switching. That is, the above aspect changes the numerical range based on the probability of correctness of prediction by the prediction scheme. Accordingly, a context corresponding to the probability of correctness (or incorrectness) of prediction by the prediction scheme is selected, and thus encoding efficiency can be improved.

For example, the encoding device: in the determining of the numerical range (S201), determines a threshold (for example, th_qphi) for specifying an upper limit and a lower limit of the numerical range; and, in the switching (S202), compares the threshold determined with the absolute value of the second information to switch the context. For example, the encoding device selects the first context when the absolute value of the second information is greater than the threshold, and selects the second context when the absolute value of the second information is less than the threshold.

Accordingly, whether or not the second information is included in the numerical range can be determined by comparing the threshold with the absolute value of the second information.

For example, in the determining of the numerical range (S201): a first threshold is determined when the intra prediction is to be used to encode the first information (for example, S104 in FIG. 4); and a second threshold greater than the first threshold is determined when the inter prediction is to be used to encode the first information (for example, S106 in FIG. 4).

That is, the above aspect increases the threshold in using the inter prediction scheme, which tends to have a lower probability of correctness than the intra prediction scheme. This can increase the possibility of selecting a context suitable for the magnitude of the prediction residual. It should be noted that even the intra prediction scheme may sometimes tend to have a low probability of correctness.

For example, the first threshold is 0, and the second threshold is an integer value greater than or equal to 1.

For example, the second information indicates a prediction residual of one of a horizontal angle and an elevation angle of the current three-dimensional point, and the first information indicates a prediction residual of a distance of the current three-dimensional point.

Accordingly, if the prediction residual of the distance depends on the absolute value of the horizontal angle or the elevation angle, the possibility of selecting a context suitable for the magnitude of the prediction residual can be increased.

For example, the second information indicates a quantized value of one of a horizontal angle and an elevation angle of the current three-dimensional point, and the first information indicates a prediction residual of at least one of a distance, a horizontal angle, or the elevation angle of the current three-dimensional point.

Accordingly, if the prediction residual of at least one of the distance, the horizontal angle, or the elevation angle depends on the absolute value of the quantized value of the horizontal angle or the elevation angle, the possibility of selecting a context suitable for the magnitude of the prediction residual can be increased.

For example, the second information indicates the quantized value of the prediction residual of the horizontal angle of the current three-dimensional point.

Accordingly, if the prediction residual of at least one of the distance, the horizontal angle, or the elevation angle depends on the absolute value of the quantized value of the horizontal angle, the possibility of selecting a context suitable for the magnitude of the prediction residual can be increased. The inventors have found, by experiment, that this combination effectively increases encoding efficiency and reduces the amount of data handled in the decoding device.

For example, in the determining of the numerical range (S201), the first threshold that is a non-zero threshold is determined when the intra prediction is to be used for the current three-dimensional point. It should be noted that, the first threshold may be zero.

Figure 6:
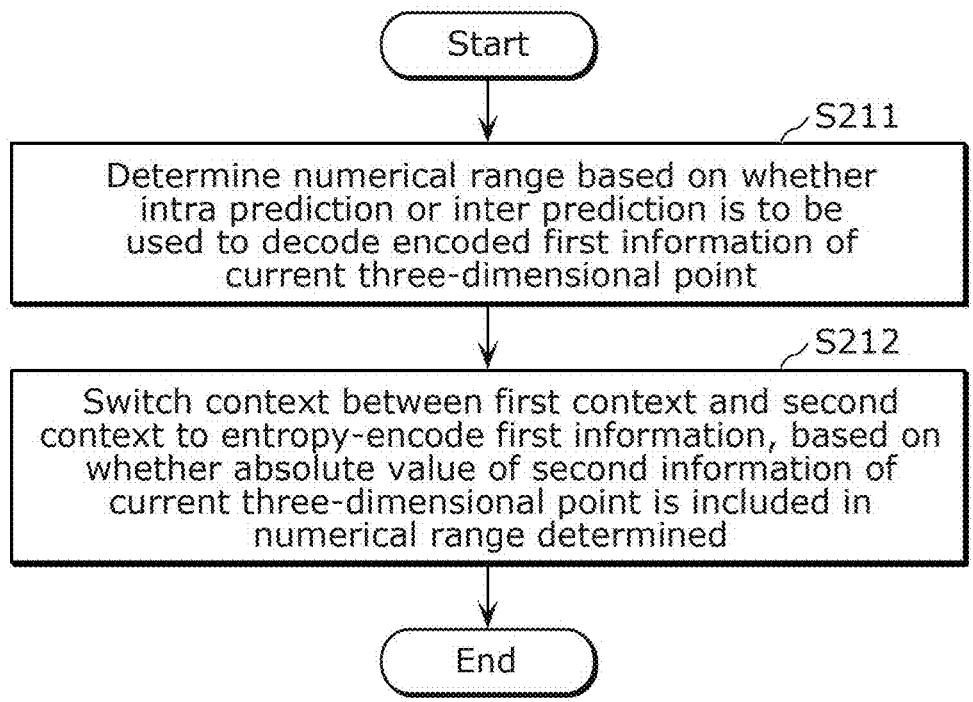
FIG. 6 is a flowchart of a three-dimensional data decoding method according to the embodiment.

Furthermore, the decoding device (three-dimensional decoding device) according to the present embodiment performs the process illustrated in FIG. 6. The decoding device determines a numerical range based on whether intra prediction or inter prediction is to be used to decode encoded first information of a current three-dimensional point (S211), and switches a context between a first context and a second context to entropy-decode the encoded first information, based on whether an absolute value of decoded second information of the current three-dimensional point is included in the numerical range determined (S212). For example, the decoding device selects the first context when the value of the second information of the current three-dimensional point is included in the determined numerical range, and selects the second context when the when the value of the second information of the current three-dimensional point is not included in the determined numerical range.

The magnitude of the value of the second information relative to the prediction residual of the first information may differ between the intra prediction scheme and the inter prediction scheme. The above aspect therefore changes, based on whether the inter prediction scheme is used or the intra prediction scheme is used, the numerical range that is used for determining context switching and that may include the value of the decoded second information. That is, the above aspect changes the numerical range based on the probability of correctness of prediction by the prediction scheme. Accordingly, a context corresponding to the probability of correctness (or incorrectness) of prediction by the prediction scheme is selected. This can reduce the data amount of a bitstream (encoded data) and thus reduce the amount of data handled in a decoding device.

For example, the decoding device: in the determining of the numerical range, determines a threshold (for example, th_qphi) for specifying an upper limit and a lower limit of the numerical range (S211), and in the switching, compares the threshold determined with the absolute value of the decoded second information to switch the context (S212). For example, the decoding device selects the first context when the absolute value of the second information is greater than the threshold, and selects the second context when the absolute value of the second information is less than the threshold.

Accordingly, whether or not the second information is included in the numerical range can be determined by comparing the threshold with the absolute value of the second information.

For example, in the determining of the numerical range (S211): a first threshold is determined when the intra prediction is to be used to decode the encoded first information (for example, S104 in FIG. 4); and a second threshold greater than the first threshold is determined when the inter prediction is to be used to decode the encoded first information (for example, S106 in FIG. 4).

In the inter prediction scheme, the magnitude of the value (e.g., the prediction residual) of the second information relative to the prediction residual of the first information may be greater than that in the intra prediction scheme. The above aspect therefore increases the threshold when the inter prediction scheme is used, thereby increasing the possibility of selecting a context suitable for the magnitude of the prediction residual of the first information. It should be noted that even the intra prediction scheme may sometimes result in a great magnitude of the value of the second information relative to the prediction residual of the first information.

For example, when the first threshold is 0, the second threshold is an integer value greater than or equal to 1.

For example, the decoded second information indicates a prediction residual of one of a horizontal angle and an elevation angle of the current three-dimensional point, and the encoded first information is generated by encoding a prediction residual of a distance of the current three-dimensional point.

Accordingly, if the prediction residual of the distance depends on the absolute value of the horizontal angle or the elevation angle, the possibility of selecting a context suitable for the magnitude of the prediction residual can be increased.

For example, the decoded second information indicates a quantized value of one of a horizontal angle and an elevation angle of the current three-dimensional point, and the encoded first information is generated by encoding a prediction residual of at least one of a distance, the horizontal angle, or the elevation angle of the current three-dimensional point.

Accordingly, if the prediction residual of at least one of the distance, the horizontal angle, or the elevation angle depends on the absolute value of the quantized value of the horizontal angle or the elevation angle, the possibility of selecting a context suitable for the magnitude of the prediction residual can be increased.

For example, the decoded second information indicates the quantized value of the prediction residual of the horizontal angle of the current three-dimensional point.

Accordingly, if the prediction residual of at least one of the distance, the horizontal angle, or the elevation angle depends on the absolute value of the quantized value of the horizontal angle, the possibility of selecting a context suitable for the magnitude of the prediction residual can be increased. The inventors have found, by experiment, that this combination effectively increases encoding efficiency and reduces the amount of data handled in the decoding device.

For example, in the determining of the numerical range (S211), the first threshold (for example, value 1) that is a non-zero threshold is determined when the intra prediction is to be used for the current three-dimensional point. It should be noted that the first threshold may be zero. Furthermore, when the first threshold is 1, the second threshold may be an integer value greater than or equal to 2.

A three-dimensional data encoding device (encoding device), a three-dimensional data decoding device (decoding device), and the like, according to embodiments of the present disclosure and variations of the embodiments have been described above, but the present disclosure is not limited to these embodiments, etc.

Note that each of the processors included in the three-dimensional data encoding device, the three-dimensional data decoding device, and the like, according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the constituent elements may be implemented as dedicated hardware or may be realized by executing a software program suited to such constituent elements. Alternatively, the constituent elements may be implemented by a program executor such as a CPU or a processor reading out and executing the software program recorded in a recording medium such as a hard disk or a semiconductor memory.

The present disclosure may also be implemented as a three-dimensional data encoding method (encoding method), a three-dimensional data decoding method (decoding method), or the like executed by the three-dimensional data encoding device (encoding device), the three-dimensional data decoding device (decoding device), and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like, according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining constituent elements in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:

1. A decoding method comprising:
   determining a numerical range based on whether intra prediction or inter prediction is to be used to decode encoded first information of a current three-dimensional point; and
   switching a context between a first context and a second context to entropy-decode the encoded first information, based on whether an absolute value of decoded second information of the current three-dimensional point is included in the numerical range determined.

2. The decoding method according to claim 1, wherein
   in the determining, a threshold for specifying an upper limit and a lower limit of the numerical range is determined, and
   in the switching, the threshold determined is compared with the absolute value of the decoded second information to switch the context.

3. The decoding method according to claim 2, wherein
   in the determining:
      a first threshold is determined when the intra prediction is to be used to decode the encoded first information; and
      a second threshold greater than the first threshold is determined when the inter prediction is to be used to decode the encoded first information.

4. The decoding method according to claim 3, wherein
   the first threshold is 0, and
   the second threshold is an integer value greater than or equal to 1.

5. The decoding method according to claim 1, wherein
   the decoded second information indicates a prediction residual of one of a horizontal angle and an elevation angle of the current three-dimensional point, and
   the encoded first information is generated by encoding a prediction residual of a distance of the current three-dimensional point.

6. The decoding method according to claim 1, wherein
   the decoded second information indicates a quantized value of one of a horizontal angle and an elevation angle of the current three-dimensional point, and
   the encoded first information is generated by encoding a prediction residual of at least one of a distance, the horizontal angle, or the elevation angle of the current three-dimensional point.

7. The decoding method according to claim 6, wherein
   the decoded second information indicates the quantized value of the prediction residual of the horizontal angle of the current three-dimensional point.

8. The decoding method according to claim 3, wherein
   in the determining, the first threshold that is a non-zero threshold is determined when the intra prediction is to be used for the current three-dimensional point.

9. An encoding method comprising:
   determining a numerical range based on whether intra prediction or inter prediction is to be used to encode first information of a current three-dimensional point; and
   switching a context between a first context and a second context to entropy-encode the first information, based on whether an absolute value of second information of the current three-dimensional point is included in the numerical range determined.

10. The encoding method according to claim 9, wherein
    in the determining, a threshold for specifying an upper limit and a lower limit of the numerical range is determined, and
    in the switching, the threshold determined is compared with the absolute value of the second information to switch the context.

11. The encoding method according to claim 10, wherein
    in the determining:
       a first threshold is determined when the intra prediction is to be used to encode the first information; and
       a second threshold greater than the first threshold is determined when the inter prediction is to be used to encode the first information.

12. The encoding method according to claim 11, wherein
    the first threshold is 0, and
    the second threshold is an integer value greater than or equal to 1.

13. The encoding method according to claim 9, wherein
    the second information indicates a prediction residual of one of a horizontal angle and an elevation angle of the current three-dimensional point, and
    the first information indicates a prediction residual of a distance of the current three-dimensional point.

14. The encoding method according to claim 9, wherein
    the second information indicates a quantized value of one of a horizontal angle and an elevation angle of the current three-dimensional point, and
    the first information indicates a prediction residual of at least one of a distance, the horizontal angle, or the elevation angle of the current three-dimensional point.

15. The encoding method according to claim 14, wherein
    the second information indicates the quantized value of the prediction residual of the horizontal angle of the current three-dimensional point.

16. The encoding method according to claim 11, wherein
    in the determining, the first threshold that is a non-zero threshold is determined when the intra prediction is to be used for the current three-dimensional point.

17. A decoding device comprising:
    a processor; and
    memory, wherein
    using the memory, the processor:
       determines a numerical range based on whether intra prediction or inter prediction is to be used to decode encoded first information of a current three-dimensional point; and
       switches a context between a first context and a second context to entropy-decode the encoded first information, based on whether an absolute value of decoded second information of the current three-dimensional point is included in the numerical range determined.

18. An encoding device comprising:
    a processor; and
    memory, wherein
    using the memory, the processor:
       determines a numerical range based on whether intra prediction or inter prediction is to be used to encode first information of a current three-dimensional point; and
       switches a context between a first context and a second context to entropy-encode the first information, based on whether an absolute value of second information of the current three-dimensional point is included in the numerical range determined.

* * * * *